(12) United States Patent
Ning et al.

(10) Patent No.: US 10,885,269 B2
(45) Date of Patent: Jan. 5, 2021

(54) ASSISTING USERS OF CHAT SESSION TO PARTICIPATE IN CHAT SESSION

(71) Applicant: International Business Machines Corporation, Armonk, NY (US)

(72) Inventors: Dong Ning, Beijing (CN); Jonathan Dunne, Dungarvan (IE); Liam S. Harpur, Dublin (IE); Xue Hong L Liang, Beijing (CN); Kai Song, Beijing (CN); Ya L. Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 16/168,564

(22) Filed: Oct. 23, 2018

(65) Prior Publication Data
US 2020/0125632 A1 Apr. 23, 2020

(51) Int. Cl.
| | | |
|---|---|---|
| *G06F 17/00* | (2019.01) | |
| *G06F 40/186* | (2020.01) | |
| *H04L 12/58* | (2006.01) | |
| *G06F 16/35* | (2019.01) | |
| *G06F 16/34* | (2019.01) | |

(52) U.S. Cl.
CPC .......... *G06F 40/186* (2020.01); *G06F 16/345* (2019.01); *G06F 16/35* (2019.01); *H04L 51/18* (2013.01)

(58) Field of Classification Search
CPC .................................................. G06F 17/2785
See application file for complete search history.

(56) References Cited

U.S. PATENT DOCUMENTS

| | | |
|---|---|---|
| 8,190,999 B2 | 5/2012 | Chen et al. |
| 8,832,569 B2 | 9/2014 | Chen et al. |
| 2005/0262199 A1 | 11/2005 | Chen et al. |

(Continued)

OTHER PUBLICATIONS

Ade-Ibijola, "FINCHAN: A Grammar-based Tool for Automatic Comprehension of Financial Instant Messages," SAICSIT '16, Sep. 26-28, 2016, Johannesburg, South Africa, copyright 2016 ACM, 10 pages. (Year: 2016).*

(Continued)

*Primary Examiner* — Amelia L Tapp
(74) *Attorney, Agent, or Firm* — Robert A. Voigt, Jr.; Winstead PC

(57) ABSTRACT

A method, system and computer program product for assisting users of a chat session to participate in the chat session. Messages of an instant message (IM) chat history are analyzed to determine the communication content. The key points of the IM chat history are then identified from the analysis, which are summarized. A first level of a hierarchical template corresponding to the determined communication content is identified, where the template corresponds to a general classification of the topic of the determined communication content. The template includes a recommended list of items to be discussed in the chat session that relates to the communication content. The template is loaded and then populated with information obtained from the analysis of the IM chat session, such as a summary of the identified key points of the IM chat history. The populated template will then be presented to the users of the chat session.

11 Claims, 9 Drawing Sheets

(56) References Cited

U.S. PATENT DOCUMENTS

| | | | | |
|---|---|---|---|---|
| 2008/0189367 A1* | 8/2008 | Okumura | ............. | H04L 67/306 |
| | | | | 709/204 |
| 2009/0089654 A1* | 4/2009 | Wittig | ................. | G06Q 10/107 |
| | | | | 715/223 |
| 2009/0313334 A1 | 12/2009 | Seacat et al. | | |
| 2015/0200879 A1 | 7/2015 | Wu et al. | | |
| 2016/0364368 A1 | 12/2016 | Chen et al. | | |
| 2017/0352050 A1* | 12/2017 | Nixon | ................... | G06F 3/0482 |
| 2018/0373696 A1* | 12/2018 | Terry | ..................... | G06N 20/00 |
| 2019/0155905 A1* | 5/2019 | Bachrach | ............. | G06F 17/277 |

OTHER PUBLICATIONS

Tepper, et al., "Collabot: Personalized Group Chat Summarization," WSDM 2018, Feb. 5-9, 2018, Marina Del Rey, CA, USA, © 2018 Association for Computing Machinery, p. 771-774. (Year: 2018).*

Joshi et al., Analysis and Detection of Eventful Messages in Instant Messengers, 3rd International Conference on Computing for Sustainable Global Development (INDIACom), Mar. 16-18, 2016, pp. 2503-2507, See Abstract.

Zhang et al., "Topic Detection in Instant Messages," 13th International Conference on Machine Learning and Applications, Detroit, Michigan, U.S.A., Dec. 3-6, 2014, pp. 219-224, See Abstract.

* cited by examiner

ASSISTING USERS OF CHAT SESSION TO PARTICIPATE IN CHAT SESSION

TECHNICAL FIELD

The present invention relates generally to instant messaging systems, and more particularly to assisting users of a chat session to participate in the chat session.

BACKGROUND

Instant messaging (IM) technology is a type of online chat that offers real-time text transmission over the Internet in a "chat session." Short messages are typically transmitted between two parties, when each user chooses to complete a thought and select "send." Some IM applications can use push technology to provide real-time text, which transmits messages character by character, as they are composed. More advanced instant messaging can add file transfer, clickable hyperlinks, Voice over IP, or video chat.

Instant messaging systems tend to facilitate connections between specified known users (often using a contact list also known as a "buddy list" or "friend list"). Depending on the IM protocol, the technical architecture can be peer-to-peer (direct point-to-point transmission) or client-server (an Instant message service center retransmits messages from the sender to the communication device).

Today, most instant messaging in a chat session takes place on messaging apps (such as WhatsApp®, Facebook® Messenger, WeChat®, and Viber®), which by 2014 had more users than social networks.

Currently, if the users of a chat session do not focus on the content of the chat session in real-time, it is easy for the users to get lost in the conversation, such as the topic, purpose, etc. of the communication.

As a result, users will have to review the historical messages of the chat session to understand the communication content. However, such a process is an inefficient way of understanding the historical content.

Furthermore, currently, IM systems lack the ability to enable users of a chat session to understand the communication content in real-time so as to allow users to maintain their understanding of the communication content.

SUMMARY

In one embodiment of the present invention, a method for assisting users of a chat session to participate in the chat session comprises analyzing messages of an instant message chat history involving a group of two or more users of the chat session to determine communication content, where the messages comprise text, images, audio and/or video. The method further comprises identifying key points of the instant message chat history from the analysis. The method additionally comprises summarizing the identified key points of the instant message chat history. Furthermore, the method comprises identifying a first template corresponding to a first level of a hierarchical template corresponding to the determined communication content, where the first template corresponds to a general classification of a topic of the determined communication content, and where the first template comprises a first recommended list of items to be discussed in the chat session. Additionally, the method comprises loading the first template. In addition, the method comprises populating the first template with information obtained from the analysis of the messages of the instant message chat history, where the information comprises the summary of the identified key points of the instant message chat history. The method further comprises presenting the first template to the two or more users of the chat session.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
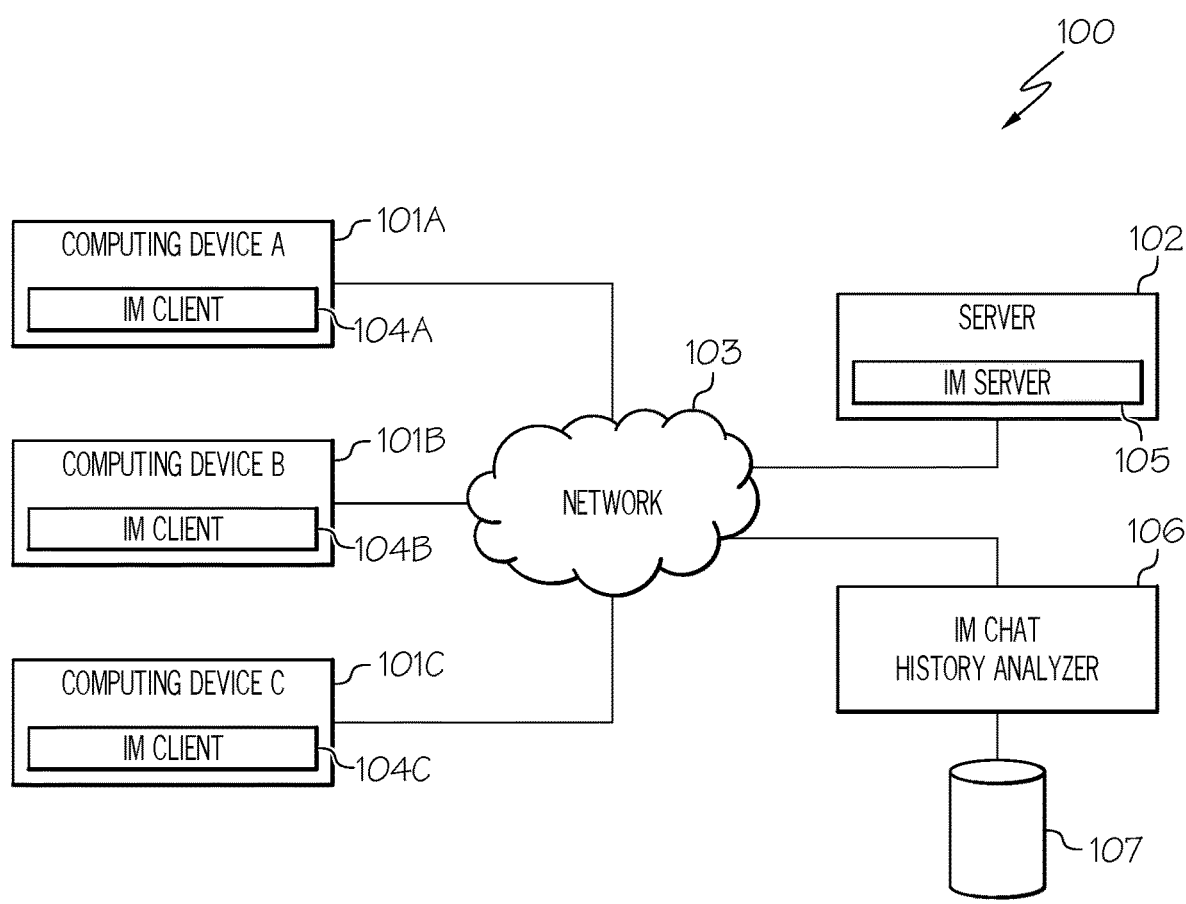
FIG. 1 illustrates a communication system configured in accordance with an embodiment of the present invention.

The present invention comprises a method, system and computer program product for assisting users of a chat session to participate in the chat session. In one embodiment of the present invention, messages of an instant message chat history are analyzed to determine the communication content, where the messages include text, images, audio and/or video. "Communication content," as used herein, refers to the topic, key points and purpose of the communications made during the chat session. Furthermore, the "instant message chat history," as used herein, refers to instant messaging communications sent between users of the chat session that have previously transpired. The key points of the instant message chat history are then identified from the analysis, which are summarized, such as by using deep learning methods for text summarization. A first level of a hierarchical template (also referred to as simply "template") corresponding to the determined communication content is identified, where the template corresponds to a general classification of the topic of the determined communication content. In one embodiment, the template includes a recommended list of items to be discussed in the chat session that relates to the topic, key points or purpose of the communication content of the analyzed instant message chat history. In this manner, the users of the chat session will be assisted in continuing the conversation in the chat session. The first level template is loaded and then populated with information obtained from the analysis of the instant messages of the chat session, such as a summary of the identified key points of the instant message chat history. In this manner, the users of the chat session will be able to understand the historical content in real-time in a more efficient manner. The populated first level template will then be presented to the users of the chat session. In this manner, the users of the chat session are assisted to participate in the chat session.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with instant message communication, the principles of the present invention may be applied to other types of communication, including non-instant message types of chat. A person of ordinary skill in the art would be capable of applying the principles of the present invention to such implementations. Further, embodiments applying the principles of the present invention to such implementations would fall within the scope of the present invention.

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. Computing device 101 may be any type of computing device (e.g., a portable computing unit, a Personal Digital Assistant (PDA), a mobile device, a tablet personal computer, a smartphone, a laptop computer, a mobile phone, a cellular phone, a navigation device, a gaming unit, a desktop computing device, a workstation, an Internet appliance and the like) configured with the capability of connecting to network 103 and consequently communicating with other computing devices 101 and server 102. Computing device 101 may be configured to send and receive text-based messages in real-time during an instant messaging session. Any user of computing devices 101 may be the creator or initiator of an instant message (message in instant messaging) and any user of computing devices 101 may be a recipient of an instant message. It is noted that both computing devices 101 and the users of computing devices 101 may be identified with element number 101.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for client device 101 to connect to the IM server 105 which provides the functionality of distributing the instant messages to the IM clients 104 associated with each of the sharing users. "Instant messages," include any one or more of the following: text, images, audio, video, etc.

System 100 further includes what is referred to herein as the "IM chat history analyzer" 106 connected to network 103 by wire or wirelessly. IM chat history analyzer 106 is configured to analyze the chat history of an IM chat session involving multiple users 101. "Chat history," as used herein, refers to the instant messaging communications sent between users 101 during a chat session that has transpired. Furthermore, IM chat history analyzer 106 is configured to determine the communication content of the messages sent during the chat session as well as identify key points of the communication content based on such an analysis. Additionally, IM chat history analyzer 106 may provide a summary of such key points, which may be stored in a database 107 connected to IM chat history analyzer 106. "Key points," as used herein, refer to the important points or aspects of the IM messages that were sent during an IM chat session. The key points are used to help user 101 understand the communication content of the IM chat session in real-time. Furthermore, IM chat history analyzer 106 identifies a hierarchical template corresponding to the determined communication content, where the template includes a summary of the identified key points of the instant message communications as well as include a recommended list of items to be discussed in the chat session. The recommended list of items is used to assist user 101 in generating appropriate IM messages during the IM chat session. A "hierarchical template," as used herein, refers to a template that includes different levels of a hierarchy, such that a first level (also referred to as the "top level") template may include one or more child templates that have a more specific classification of the communication content. For example, a first level template may be directed to a design/solution discussion which includes the child templates of design review and issue solution. In one embodiment, such hierarchical templates are stored in database 107. A more detailed discussion regarding the use of the hierarchical template to assist user 101 in understanding the communication content of the IM chat session in real-time as well as assist user 101 in generating appropriate IM messages is provided further below. A description of the hardware configuration of IM chat history analyzer 106 is provided below in connection with FIG. 2.

While system 100 illustrates a single database 107, system 100 may utilize multiple databases, where each database stores particular information, such as a database directed to storing summaries of different IM chat sessions, a database directed to storing hierarchical templates, etc.

System 100 is not to be limited in scope to any one particular network architecture. System 100 may include any number of computing devices 101, servers 102, networks 103, IM chat history analyzers 106 and databases 107. Furthermore, while FIG. 1 illustrates IM chat history analyzer 106 as being a separate physical device, some or all of the functionality of IM chat history analyzer 106 may reside in computing device 101.

Figure 2:
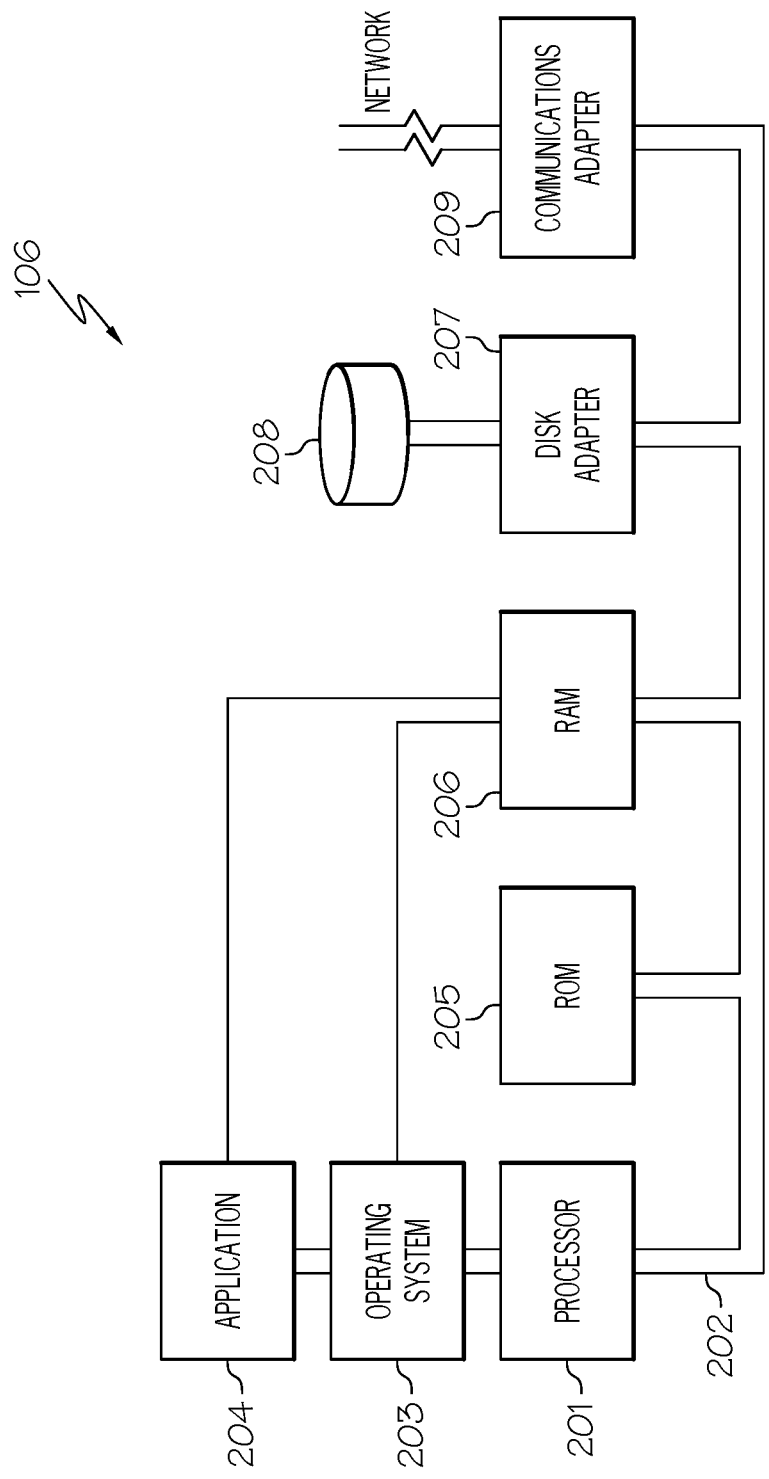
FIG. 2 illustrates an embodiment of the present invention of a hardware configuration of an instant message chat history analyzer which is representative of a hardware environment for practicing the present invention.

Referring now to FIG. 2, FIG. 2 illustrates a hardware configuration of IM chat history analyzer 106 (FIG. 1) which is representative of a hardware environment for practicing the present invention. Referring to FIG. 2, IM chat history analyzer 106 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for assisting users of a chat session to participate in the chat session using hierarchical templates as discussed below in association with FIGS. 3-9.

Referring again to FIG. 2, read-only memory ("ROM") 205 is coupled to system bus 202 and includes a basic input/output system ("BIOS") that controls certain basic functions of IM chat history analyzer 106. Random access memory ("RAM") 206 and disk adapter 207 are also coupled to system bus 202. It should be noted that software components including operating system 203 and application 204 may be loaded into RAM 206, which may be IM chat history analyzer's 106 main memory for execution. Disk adapter 207 may be an integrated drive electronics ("IDE") adapter that communicates with a disk unit 208, e.g., disk drive. It is noted that the program for assisting users of a chat session to participate in the chat session using hierarchical templates, as discussed below in association with FIGS. 3-9, may reside in disk unit 208 or in application 204.

IM chat history analyzer 106 may further include a communications adapter 209 coupled to bus 202. Communications adapter 209 interconnects bus 202 with an outside network (e.g., network 103 of FIG. 1) thereby allowing IM chat history analyzer 106 to communicate with computing devices 101 and server 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, instant messaging (IM) technology is a type of online chat that offers real-time text transmission over the Internet in a "chat session." Short messages are typically transmitted between two parties, when each user chooses to complete a thought and select "send." Some IM applications can use push technology to provide real-time text, which transmits messages character by character, as they are composed. More advanced instant messaging can add file transfer, clickable hyperlinks, Voice over IP, or video chat. Instant messaging systems tend to facilitate connections between specified known users (often using a contact list also known as a "buddy list" or "friend list"). Depending on the IM protocol, the technical architecture can be peer-to-peer (direct point-to-point transmission) or client-server (an Instant message service center retransmits messages from the sender to the communication device). Today, most instant messaging in a chat session takes place on messaging apps (such as WhatsApp®, Facebook® Messenger, WeChat®, and Viber®), which by 2014 had more users than social networks. Currently, if the users of a chat session do not focus on the content of the chat session in real-time, it is easy for the users to get lost in the conversation, such as the topic, purpose, etc. of the communication. As a result, users will have to review the historical messages of the chat session to understand the communication content. However, such a process is an inefficient way of understanding the historical content. Furthermore, currently, IM systems lack the ability to enable users of a chat session to understand the communication content in real-time so as to allow users to maintain their understanding of the communication content.

Figure 3:
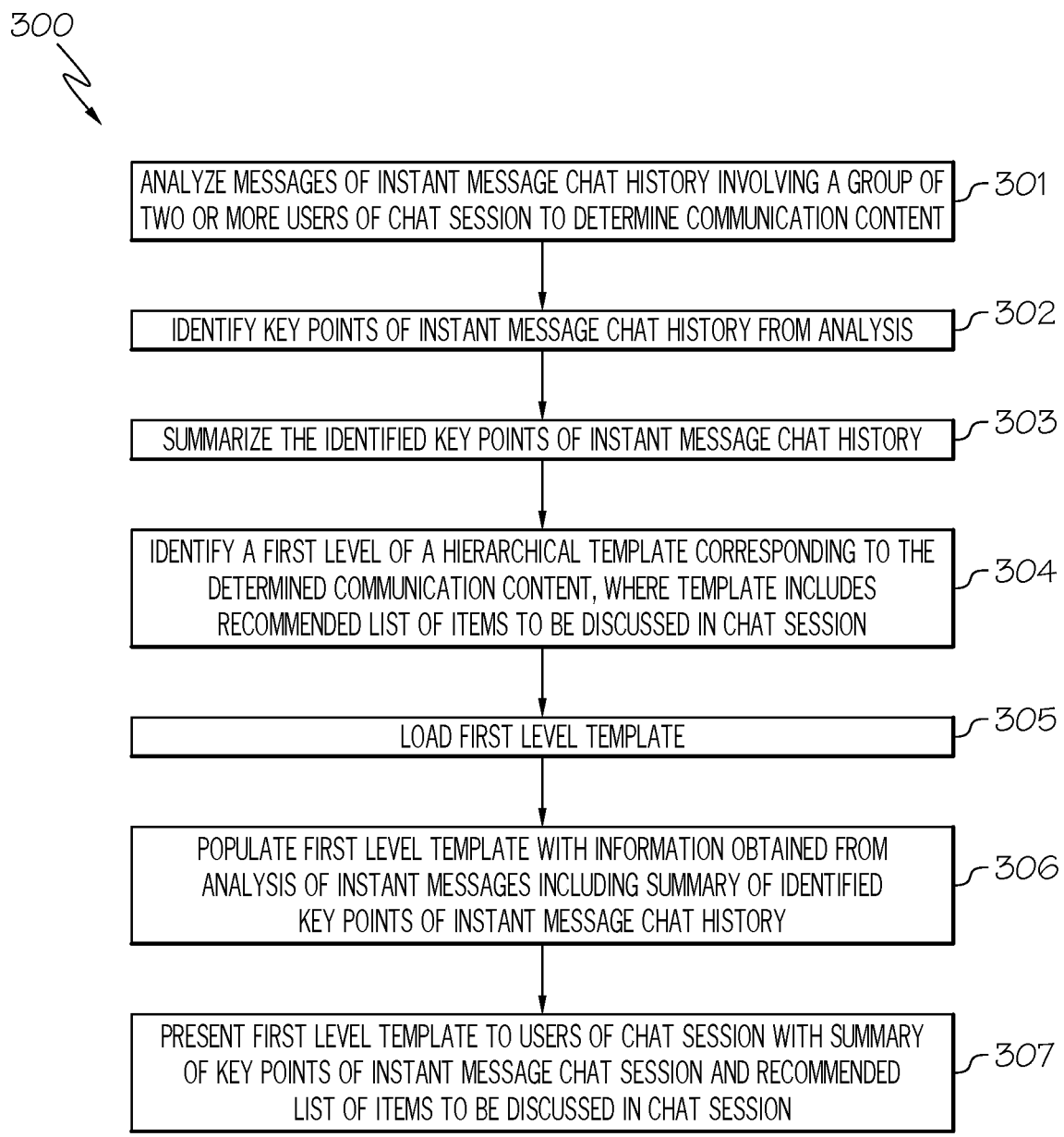
FIG. 3 is a flowchart of a method for assisting users of a chat session to participate in the chat session in accordance with an embodiment of the present invention.
Figure 4:
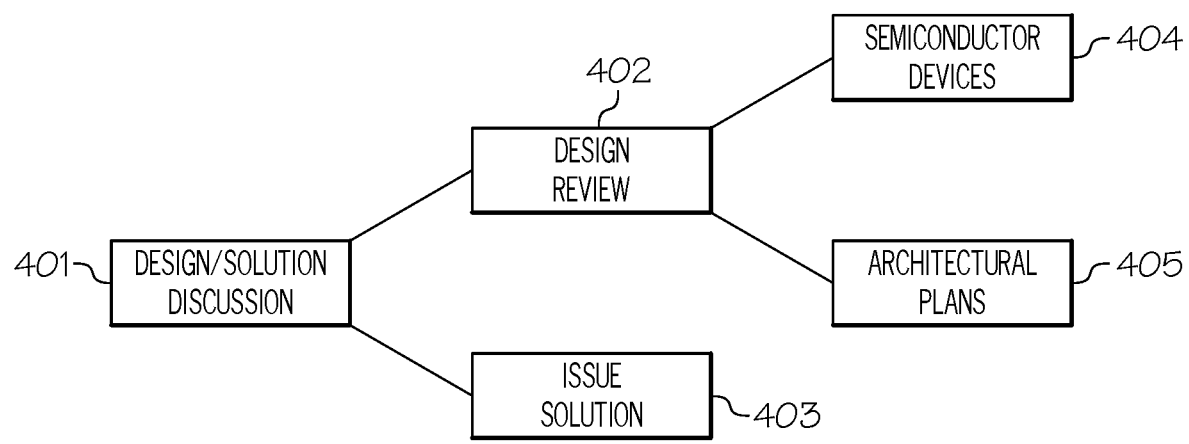
FIG. 4 illustrates the hierarchical form of templates in accordance with an embodiment of the present invention.
Figure 5:
FIG. 5 illustrates an example of a template directed to traveling in accordance with an embodiment of the present invention.
Figure 6:
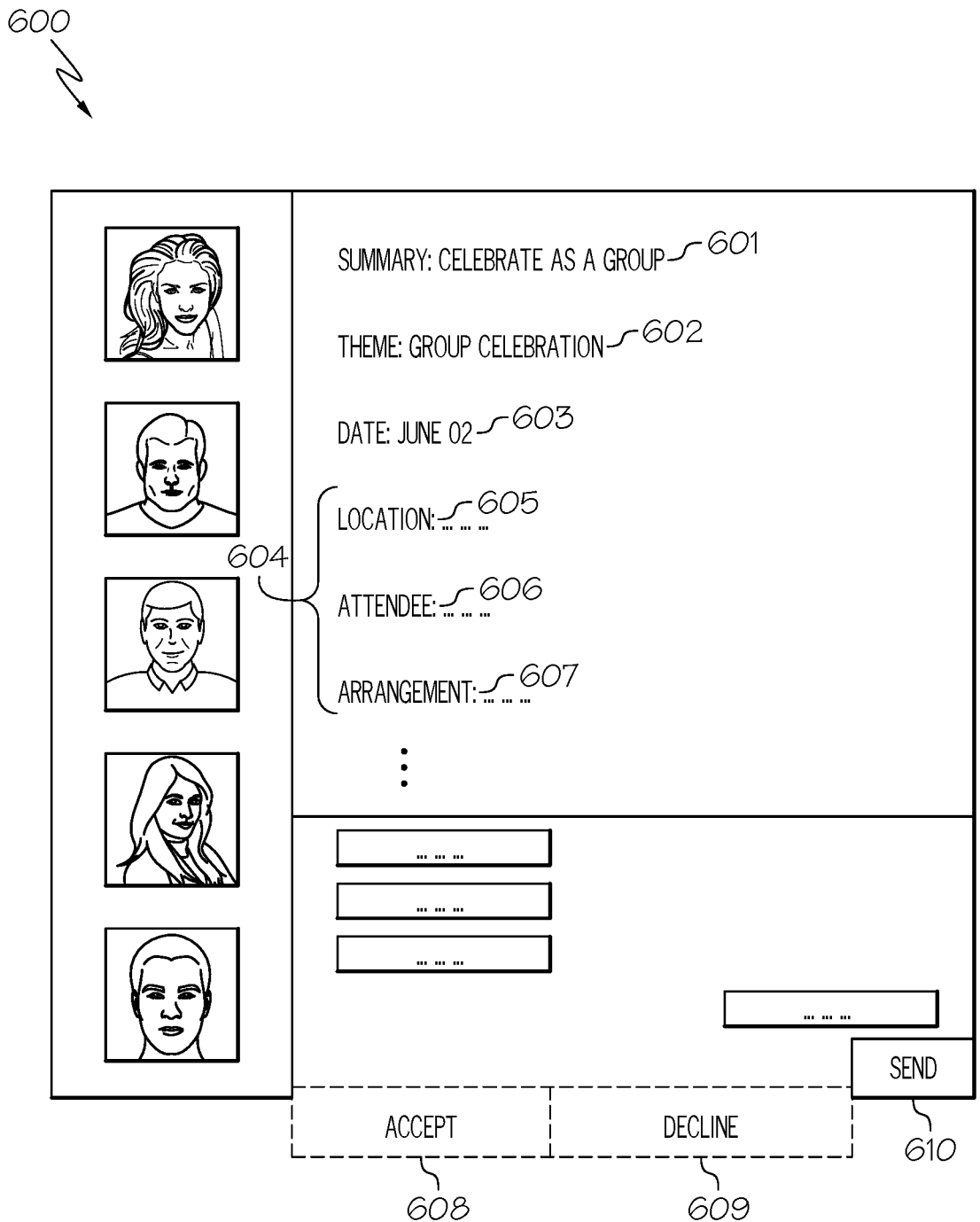
FIG. 6 illustrates a further example of a template directed to a group celebration in accordance with an embodiment of the present invention.
Figure 7:
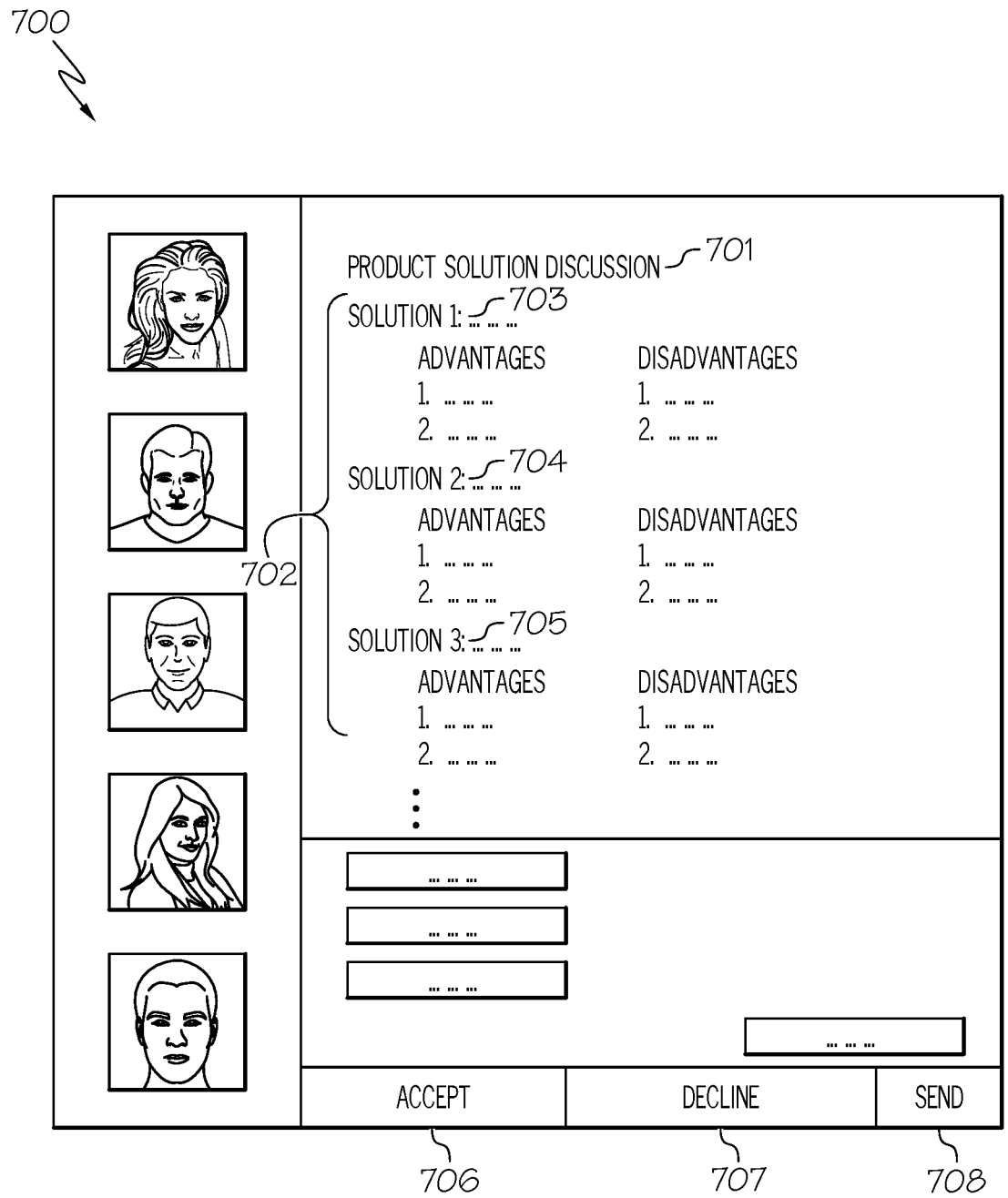
FIG. 7 illustrates another example of a template directed to a product solution discussion in accordance with an embodiment of the present invention.
Figure 8:
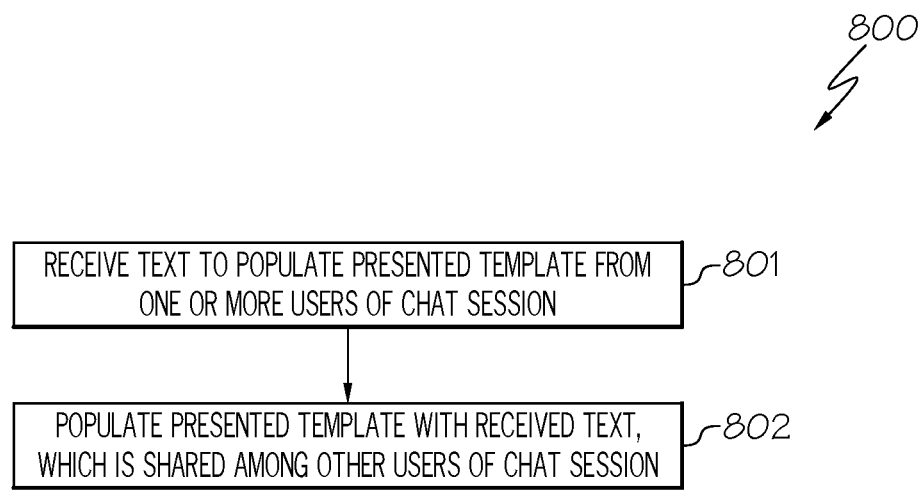
FIG. 8 is a flowchart of a method for utilizing the template by the users of the chat session in accordance with an embodiment of the present invention.
Figure 9:
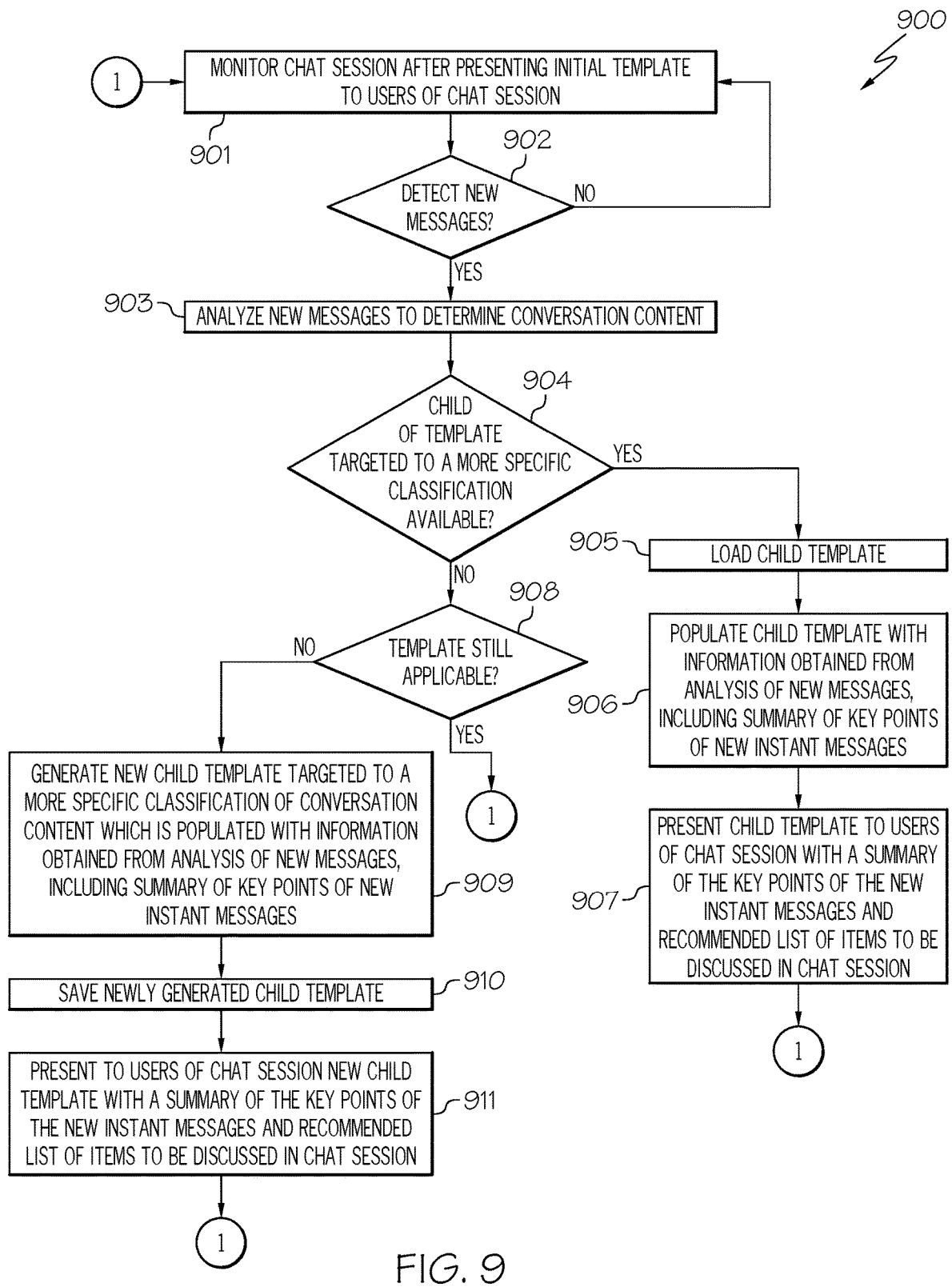
FIG. 9 is a flowchart of a method for utilizing a child template in accordance with an embodiment of the present invention.

The embodiments of the present invention provide a means for assisting users of a chat session to participate in the chat session by providing a summary of the key points in an instant messaging chat history in a hierarchical template which also includes a recommended list of items to be discussed in the chat session pertaining to the topic of the chat session as discussed below in connection with FIGS. 3-9. FIG. 3 is a flowchart of a method for assisting users of a chat session to participate in the chat session. FIG. 4 illustrates the hierarchical form of templates. FIG. 5 illustrates an example of a template directed to traveling. FIG. 6 illustrates a further example of a template directed to a group celebration. FIG. 7 illustrates another example of a template directed to a product solution discussion. FIG. 8 is a flowchart of a method for utilizing the template by the users of the chat session. FIG. 9 is a flowchart of a method for utilizing a child template.

As stated above, FIG. 3 is a flowchart of a method 300 for assisting users of a chat session to participate in the chat session in accordance with an embodiment of the present invention.

Referring to FIG. 3, in conjunction with FIGS. 1-2, in step 301, IM chat history analyzer 106 analyzes messages of an instant message chat history involving a group of two or more users 101 of a chat session to determine the communication content, where the messages include text, images, audio and/or video. "Communication content," as used herein, refers to the topic, key points and purpose of the communications made during the chat session. For example, users 101A-101C may be transmitting instant messages amongst each other in a chat session. After a period of time has elapsed, which may be user-specified, IM chat history analyzer 106 may be configured to analyze such messages to determine the communication content, such as determining the topic, the key points (discussed further below), the purpose, etc. of the messages sent between users 101 during the chat session. As discussed above, "messages," as used herein, include any type of electronic communication that includes text, images, audio and/or video. Furthermore, "instant message chat history," refers to the instant messaging communications sent between users 101 during a chat session that has transpired.

In one embodiment, IM chat history analyzer 106 analyzes the instant messages of the instant message chat history using natural language processing, such as identifying keywords that indicate the topic, the key points or purpose of the communications. For example, IM chat history analyzer 106 may identify keywords, such as travel, discussion, sports, to indicate the topic, the key point or purpose of the communications. For instance, various IM messages may discuss traveling to Florida. By identifying keywords, such as traveling and Florida, IM chat history analyzer 106 may deduce, using natural language processing, that the topic, key point or purpose of the communications is a trip to Florida.

In one embodiment, such keywords can be identified from messages that include text, images, audio or video. In one embodiment, for messages with audio or video (which includes audio), the audio may be converted to text, such as by using IBM Watson® speech to text service to convert the audio to text, which is then analyzed using natural language processing as discussed above. In another example, IM chat history analyzer 106 utilizes transcription software (e.g., Scribie Service by Scribie, Dragon® Naturally Speaking 13 Premium, and Express Scribe by NCH Software®, Inc.) to convert the audio to text, which is then analyzed using natural language processing as discussed above.

In one embodiment, the emotive meaning in images may be determined by IM chat history analyzer 106, such as by matching the analyzed images with images stored in database 107 which are tagged with a specific emotive meaning. "Emotive meaning," as used herein, refers to the emotional connotation of a word or expression that is used instead of one having a similar meaning but less affective quality. Such deduced emotive meaning will assist IM chat history analyzer 106 in determining the communication content of the communications made during the chat session.

In step 302, IM chat history analyzer 106 identifies the key points of the instant message chat history from the analysis. As discussed above, IM chat history analyzer 106 may utilize natural language processing to identify the key points from analyzing the messages of the IM chat history.

In step 303, IM chat history analyzer 106 summarizes the identified key points of the IM chat history. In one embodiment, IM chat history analyzer 106 summaries the identified key points using deep learning methods for text summarization. In one embodiment, extractive summarization is accomplished using Textrank and term frequency-inverse document frequency (TF-IDF) algorithms. For example, the identified key points may relate to the aspect of traveling and the state of Florida. IM chat history analyzer 106 may summarize the identified key points of the IM chat history to "traveling to the state of Florida."

In step 304, IM chat history analyzer 106 identifies a first level of a hierarchical template (also referred to as simply "template") corresponding to the determined communication content, where the template corresponds to a general classification of the topic of the determined communication content. In one embodiment, the template includes a recommended list of items to be discussed in the chat session that relates to the topic, key points or purpose of the communication content of the analyzed IM chat history. In one embodiment, such a recommended list has been previously generated by IM chat history analyzer 106 using a recommendation system, which involves collecting relevant information (information related to a topic), constructing a model providing a recommended list of items to be discussed in connection with the relevant information, receiving feedback regarding correctness of the recommendations, and applying a learning algorithm to utilize the feedback gathered to make more accurate recommendations. In one embodiment, such a recommended list of items may be user-specified.

A "hierarchical template," as used herein, refers to a template that includes different levels of a hierarchy or nested templates, such that a first level (also referred to as the "top level") template may include one or more child templates that have a more specific classification of the communication content as shown in FIG. 4.

FIG. 4 illustrates an example of a hierarchical template in accordance with an embodiment of the present invention. Referring to FIG. 4, a first level template 401 may be directed to a design/solution discussion which includes the child template 402 directed to design review and the child template 403 directed to issue solution 403, and where the design review template 402 includes the child template 404 directed to a design review involving semiconductor devices and the child template 405 directed to a design review involving architectural plans.

A "first level" template (e.g., template directed to travel), as used herein, refers to the highest level template in a hierarchy directed to a particular topic, key point(s) or purpose of communication content. Each "child" template of the first level template includes a more specific classification (e.g., template directed to traveling to Florida).

Furthermore, in one embodiment, each template (both parent and children, where a "parent template" refers to a higher level template that has one or more "child templates" that are nested within the parent template) includes a summary of the identified key points of the communication content. For example, the first level template directed to traveling may include a summary of the IM messages involving traveling.

Additionally, in one embodiment, each template includes a recommended list of items to be discussed in the chat session to assist users 101 in communicating during the chat session. For example, the first level template directed to traveling may include a list of items to be discussed that includes, the specific destination, the dates of the trip, the manner of traveling to destination, etc. as shown in FIG. 5.

FIG. 5 illustrates an example of a template 500 directed to traveling in accordance with an embodiment of the present invention.

Referring to FIG. 5, template 500 is a template directed to traveling. As shown in FIG. 5, template 500 includes a summary 501 of the key points of the communication content of the IM chat history involving multiple users 101. In the example of FIG. 5, summary 501 is directed to traveling over the summer.

Furthermore, template 500 includes a recommended list of items 502 to be discussed in the chat session. In the example of FIG. 5, such a recommended list 502 includes the date of the trip 503, the specific destination 504 (e.g., Orlando, Fla.), the manner of traveling 505 (e.g., airplane) and who's attending 505 (e.g., brother, sister, friend).

As will be discussed in further detail below, after presenting template 500 to users 101 of the chat session, each user 101 may have the opportunity to populate the template to assist them in generating appropriate IM messages during the chat session.

FIG. 6 illustrates a further example of a template directed to a group celebration in accordance with an embodiment of the present invention.

Referring to FIG. 6, template 600 is a template directed to a group celebration. As shown in FIG. 6, template 600 includes a summary 601 of the key points of the communication content of the IM chat history involving multiple users 101. In the example of FIG. 6, summary 601 is directed to celebrating as a group.

Furthermore, template 600 includes a theme 602 directed to a group celebration as well as a date 603 (e.g., June $2^{nd}$), which IM chat analyzer 106 obtained from analyzing the IM messages of the chat session using natural language processing.

Additionally, template 600 includes recommended list of items 604 to be discussed in the chat session. In the example of FIG. 6, such a recommended list 604 includes the location 605, attendee 606 and arrangement 607.

As will be discussed in further detail below, after presenting template 600 to users 101 of the chat session, each user 101 may have the opportunity to populate the template to assist them in generating appropriate IM messages during the chat session.

FIG. 7 illustrates another example of a template directed to a product solution discussion in accordance with an embodiment of the present invention.

Referring to FIG. 7, template 700 is a template directed to a product solution discussion. As shown in FIG. 7, template 700 includes a summary 701 of the key points of the communication content of the IM chat history involving multiple users 101. In the example of FIG. 7, summary 701 is directed to a product solution discussion.

Furthermore, template 700 includes a recommended list of items 702 to be discussed in the chat session. In the example of FIG. 7, such a recommended list 702 includes various solutions (e.g., solution 1 703, solution 2 704 and solution 3 705), where each solution 703, 704 and 705 includes advantages and disadvantages.

As will be discussed in further detail below, after presenting template 700 to users 101 of the chat session, each user 101 may have the opportunity to populate the template to assist them in generating appropriate IM messages during the chat session.

Returning to FIG. 3, in conjunction with FIGS. 1-2 and 4-7, in step 305, IM chat history analyzer 106 loads the first level template.

In step 306, IM chat history analyzer 106 populates the first level template with information obtained from the analysis of the instant messages of the chat session, including the summary of the key points of the instant message chat history. In this manner, users 101 of the chat session will be able to understand the historical content in real-time in a more efficient manner. For example, referring to FIG. 6, IM chat history analyzer 106 populates the summary 601 of the key points of the instant message chat history as well as populates the date 603 of the group celebration. In a further example, referring to FIG. 5, IM chat history analyzer 106 may populate fields, such as the date of the trip 503, which may be deduced from applying natural language processing to the instant messages of the chat session.

In step 307, IM chat history analyzer 106 presents the first level template to users 101 of the chat session, which is displayed on the user's computing device, where the first level template includes a summary of the identified key points of the instant message chat session as well as the recommended list of items to be discussed in the chat session as discussed above in connection with FIGS. 5-7. In this manner, the users of the chat session are assisted to participate in the chat session.

In response to receiving such a template, user 101 of the chat session may utilize the template, such as by filling in the answers to the recommended items, which can then be published in the chat session as discussed below in connection with FIG. 8.

FIG. 8 is flowchart of a method 800 for utilizing the template by the users of the chat session in accordance with an embodiment of the present invention.

Referring to FIG. 8, in conjunction with FIGS. 1-7, in step 801, IM chat history analyzer 106 receives text to populate the presented template from one or more users 101 (e.g., user of computing device 101A) of the chat session.

In step 802, IM chat history analyzer 106 populates the presented template with the received text, which is shared among other users 101 of the chat session (e.g., users of computing devices 101B, 101C).

For example, referring to FIG. 5, user 101A may provide the date of trip 503, the specific destination 504 and the manner of traveling 505. Such information will be populated in template 500. User 101A will then have the opportunity to accept or decline the populated information by selecting the accept icon 507 or selecting the decline icon 508, respectively, before it is published in the chat session by user 101A selecting the send button icon 509.

Similarly, as shown in FIG. 6, user 101 may provide the location 605, attendee 606 and arrangement 607 of the group celebration. Such information will be populated in template 600. User 101 will then have the opportunity to accept or decline the populated information by selecting the accept icon 608 or selecting the decline icon 609, respectively, before it is published in the chat session by user 101 selecting the send button icon 610.

In a further example as shown in FIG. 7, user 101 may select solution 1 to the product solution discussion. Such a selection may then be accepted by selecting the accept icon 706 or declined by selecting the decline icon 707 prior to it being published in the chat session by user 101 selecting the send button icon 708.

As discussed above, such templates are hierarchical or nested, in that child templates are directed to a more specific classification of the communication content than the parent template. Such child templates may be presented to users 101 of the chat session as further instant messages are published during the chat session as discussed below in connection with FIG. 9.

FIG. 9 is a flowchart of a method 900 for utilizing a child template in accordance with an embodiment of the present invention.

Referring to FIG. 9, in conjunction with FIGS. 1-8, in step 901, IM chat history analyzer 106 monitors the chat session after presenting the initial template to users 101 of the chat session.

In step 902, a determination is made by IM chat history analyzer 106 as to whether new messages are detected as being published in the chat session. If there are no further messages being published in the chat session, then IM chat history analyzer 106 continues to monitor the chat session in step 901.

If, however, IM chat history analyzer 106 detects new messages being published in the chat session, then, in step 903, IM chat history analyzer 106 analyzes the new messages to determine the conversation content as discussed above in connection with step 301.

For example, IM chat history analyzer 106 continues to analyze the IM messages that are published during the chat session after presenting the initial template using natural language processing. For example, IM chat history analyzer 106 continues to search for additional keywords from the text, images, audio or video using natural language processing. For example, the audio may be converted to text, such as by using IBM Watson® speech to text service to convert the audio to text, which is then analyzed using natural language processing. In another example, IM chat history analyzer 106 utilizes transcription software (e.g., Scribie Service by Scribie, Dragon® Naturally Speaking 13 Premium, and Express Scribe by NCH Software®, Inc.) to convert the audio (including the audio in the video) to text, which is then analyzed using natural language processing as discussed above. In another embodiment, the emotive meaning in images may be determined by IM chat history analyzer 106, such as by matching the analyzed images with images stored in database 107 which are tagged with a specific emotive meaning. Such deduced emotive meaning will assist IM chat history analyzer 106 in determining the communication content of the communications made during the chat session.

Furthermore, as discussed above, such analysis may involve identifying the key points of the new messages analyzed as well as summarizing such key points as discussed above in connection with steps 302, 303.

In step 904, a determination is made by IM chat history analyzer 106 as to whether there exists a child template targeted to a more specific classification that is directed to the communication content of these new messages based on the analysis of the new messages published during the chat session. For example, the initial template may be directed to traveling to Florida. The new messages may be focused on traveling to Walt Disney World® in Florida. A search of database 107 may be performed by IM chat history analyzer 106 as to whether there exists a template that is more specific to traveling to Walt Disney World® in Florida, such as a child template of the template directed to traveling to Florida, which may be directed to traveling to Walt Disney World® in Florida. If such a template exists, then that template is loaded as discussed further below.

Furthermore, as discussed above, each template includes a recommended list of items to be discussed. In the child template, such as the child template directed to traveling to Walt Disney World® in Florida, such recommended items may include hotels in Orlando, the various theme parks at Walt Disney World® in Florida, etc.

In step 905, IM chat history analyzer 106 loads the child template.

In step 906, IM chat history analyzer 106 populates the child template with information obtained from the analysis of the new messages. For example, as discussed above, the IM chat history analyzer 106 may populate the child template with a summary of the key points of the newly analyzed messages, such as traveling to Walt Disney World® in Florida to see Mickey Mouse®.

In step 907, IM chat history analyzer 106 presents the child template to users 101 of the chat session with a summary of the key points of the new instant messages and a recommended list of items to be discussed in the chat session as discussed above.

IM chat history analyzer 106 then continues to monitor the chat session for new instant messages after presenting the child template to users 101 of the chat session in step 901.

If, however, there does not exist a child template targeted to a more specific classification that is directed to the communication content of these new messages based on the analysis of the new messages published during the chat session, then, in step 908, a determination is made by IM chat history analyzer 106 as to whether the currently provided template, such as the first level template, is still applicable.

If the currently provided template is still applicable, then users 101 of the chat session will continue to utilize the current template and IM chat history analyzer 106 will continue to monitor the chat session for new messages in step 901. For example, the current template may be directed to traveling to Florida and it is determined, after analyzing the new messages, that the new messages are still directed to traveling to Florida in the general sense. As a result, the current template will continue to be utilized by users 101 of the chat session and IM chat history analyzer 106 will continue to monitor the chat session for new messages in step 901.

If, however, the analyzed new messages indicate a greater specificity to the topic, key point(s) or purpose of the communication content directed to the currently presented template, then, in step 909, IM chat history analyzer 106 generates a new child template targeted to a more specific classification of the conversation content which is populated with information obtained from the analysis of the new messages, including a summary of the key points of the new instant messages.

For example, the initial template may be directed to traveling to Florida. The new messages may be focused on traveling to the Kennedy Space Center in Florida. A search of database 107 may be performed by IM chat history analyzer 106 as to whether there exists a template that is more specific to traveling to the Kennedy Space Center in Florida. If there does not exist such a child template, then IM chat history analyzer 106 may generate a new child template directed to traveling to Kennedy Space Center in Florida.

Such a template may include a summary of the key points of the new messages analyzed as discussed above as well as a recommended list of items to be discussed, such as the various tours offered at the Kennedy Space Center, various events occurring at the Kennedy Space Center, astronaut training, etc. Such a recommended list of items may be generated by IM chat history analyzer 106 using a recommendation system, which involves searching and identifying information pertaining to the Kennedy Space Center on the Internet, such as analyzing webpages directed to the Kennedy Space Center. Such an analysis may involve using natural language processing to identify the activities, events, etc. that occur at the Kennedy Space Center and to deduce a list of items to be discussed from such identified activities, events, etc.

In step 910, IM chat history analyzer 106 saves the newly generated template, such as to database 107.

In step 911, IM chat history analyzer 106 presents to users 101 of the chat session the new child template with a summary of the key points of the new instant messages and a recommended list of items to be discussed in the chat session as discussed above.

IM chat history analyzer 106 then continues to monitor the chat session for new instant messages after presenting the child template to users 101 of the chat session in step 901.

Method 900 continues to be implemented until the chat session is terminated.

An example of using embodiments of the present invention to assist the users of a chat session to participate in the chat session is provided below.

Tom, Jerry, John, May, Lee and Ivy are chatting using an instant message (IM) application. They are communicating via text, emotive images and audio media. The following are messages that were exchanged during the IM chat history.
Tom: Hi, everyone.
May: ☺
Lee: Let's eat at a restaurant.
Ivy: Sounds good.

The present invention analyzes such messages to determine that the users of the chat session would like to meet at a restaurant. As a result, the present invention identifies a first level template directed to going to a restaurant, which includes a summary of the content of the analyzed messages as well as a recommended list of items to be discussed in the chat session, such as the date, time, address of the restaurant, etc. The first level template is then presented to the users of the chat session.

After presenting the first level template to the users of the chat session, the following message is exchanged.
Jerry: How about dinner?

The present invention analyzes the message to determine that the users would possibly like to meet at a restaurant for dinner. As a result, the present invention identifies a child template directed to going to a restaurant for dinner, which includes a summary of the content of the analyzed messages, including the new message, as well as a recommended list of items to be discussed in the chat session, such as restaurant styles, types of food commonly eaten for dinner, etc. The child template is then presented to the users of the chat session.

After presenting the child template to the users of the chat session, the following messages are exchanged.
May: Sushi?
Lee: I like beefsteak.
Tom: Me too.
Ivy: How about fish?

The present invention analyzes the messages to determine that the users would like to go to a restaurant for dinner with various options. As a result, the present invention identifies a child template directed to going to a restaurant for dinner with various types of foods offered, where the child template includes a summary of the content of the analyzed messages, including the new messages, as well as a recommended list of items to be discussed in the chat session, such as a list of food choices offered at dinner restaurants that offer various options, where such options may be voted by the users of the chat session, such as by using a dialog box.

After presenting the child template to the users of the chat session, the following messages are later exchanged.
May: Bye for now.
Lee: See you later.

The present invention may deduce via natural language processing that the chat session has ended due to the term "bye" and the phrase "see you later" being used. A report view for the conversation session may then be generated.

After presenting the generated report, the following messages are later exchanged.
Tom: Let's celebrate team building.
Ivy: We will award Jerry's accomplishment.

The present invention after analyzing the newly presented messages may determine that the users of the chat session are attending dinner together to celebrate team building. This is a specific type of dinner gathering which does not have a corresponding template. As a result, the present invention may generate a new template directed to gathering together for a dinner to celebrate team building. Such a template will be nested within the previously presented template. When the present invention detects messages being directed to a dinner for celebration, such as to celebrate team building, the present invention may identify and present such a template, which may include a recommendation to present an award.

In this manner, the present invention assists the users of the chat session to participate in the chat session, such as assisting users to continue the conversation in the chat session as well as enable users of the chat session to understand the historical content in real-time in an efficient manner.

Furthermore, in this manner, the functionality or capability of computing systems is improved by eliminating the need for users to spend time and utilize computing resources (e.g., processing resources) to review historical messages in an attempt to understand the communication content of the chat session. By reducing the amount of computing resources being utilized by users from reviewing historical messages, computing resources (e.g., processing resource) are more efficiently utilized.

Furthermore, the present invention improves the technology or technical field involving instant messaging systems. As discussed above, currently, if the users of a chat session do not focus on the content of the chat session in real-time, it is easy for the users to get lost in the conversation, such as the topic, purpose, etc. of the communication. As a result, users will have to review the historical messages of the chat session to understand the communication content. However, such a process is an inefficient way of understanding the historical content. Furthermore, currently, IM systems lack the ability to enable users of a chat session to understand the communication content in real-time so as to allow users to maintain their understanding of the communication content.

The present invention improves such technology by assisting users of a chat session to participate in the chat session by providing a summary of the key points in an instant messaging chat history in a hierarchical template. In this manner, the users of the chat session will be able to understand the historical content in real-time in a more efficient manner. Furthermore, these hierarchical templates, which may include nested templates, include a relevant recommended list of items to be discussed in the chat session that relates to the topic, key points or purpose of the communications of the chat session. In this manner, the users of the chat session will be assisted in continuing the conversation in the chat session.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:
1. A method for assisting users of a chat session to participate in said chat session, the method comprising:
analyzing, by an IM chat history analyzer, messages of an instant message chat history involving a group of two or more users of said chat session to determine communication content, wherein said IM chat history analyzer is a computing device, wherein computing devices of said group of two or more users of said chat session are connected to said IM chat history analyzer via a network, wherein said messages comprise text, images, audio and/or video;
identifying, by said IM chat history analyzer, key points of said instant message chat history from said analysis;
summarizing, by said IM chat history analyzer, said identified key points of said instant message chat history;
identifying, by said IM chat history analyzer, a first template corresponding to a first level of a hierarchical template corresponding to said determined communication content, wherein said hierarchical template is a template that includes different levels of a hierarchy or nested templates, wherein said first template corresponds to a general classification of a topic of said determined communication content, wherein said first template comprises a first recommended list of items to be discussed in said chat session;
loading, by said IM chat history analyzer, said first template;
populating, by said IM chat history analyzer, said first template with information obtained from said analysis of said messages of said instant message chat history, wherein said information comprises said summary of said identified key points of said instant message chat history;
presenting, by said IM chat history analyzer, said first template to said two or more users of said chat session;
monitoring said chat session after presenting said first template to said two or more users of said chat session;
analyzing new messages to determine additional conversation content;
loading a second template corresponding to a second level of said hierarchical template directed to a more specific classification of said topic of said determined communication content based on said analysis of said new messages; and
populating said second template with information obtained from said analysis of said new messages, wherein said information comprises a summary of key points of said additional conversation content, wherein said second template further comprises a second recommended list of items to be discussed in said chat session.

2. The method as recited in claim 1 further comprising:
presenting said second template to said two or more users of said chat session.

3. The method as recited in claim 1 further comprising:
generating a new template targeted to a more specific classification of said topic of said determined communication content based on said analysis of said new messages, wherein said new template is nested within said first template; and
populating said new template with information obtained from said analysis of said new messages, wherein said information comprises a summary of key points of said additional conversation content, wherein said new template further comprises a second recommended list of items to be discussed in said chat session.

4. The method as recited in claim 3 further comprising:
presenting said new template to said two or more users of said chat session.

5. A computer program product for assisting users of a chat session to participate in said chat session, the computer program product comprising a computer readable storage medium having program code embodied therewith, the program code comprising the programming instructions for:
analyzing messages of an instant message chat history involving a group of two or more users of said chat session to determine communication content, wherein said messages comprise text, images, audio and/or video;
identifying key points of said instant message chat history from said analysis;
summarizing said identified key points of said instant message chat history;
identifying a first template corresponding to a first level of a hierarchical template corresponding to said determined communication content, wherein said hierarchical template is a template that includes different levels of a hierarchy or nested templates, wherein said first template corresponds to a general classification of a topic of said determined communication content, wherein said first template comprises a first recommended list of items to be discussed in said chat session;
loading said first template;
populating said first template with information obtained from said analysis of said messages of said instant message chat history, wherein said information comprises said summary of said identified key points of said instant message chat history;
presenting said first template to said two or more users of said chat session;
monitoring said chat session after presenting said first template to said two or more users of said chat session;
analyzing new messages to determine additional conversation content;
loading a second template corresponding to a second level of said hierarchical template directed to a more specific classification of said topic of said determined communication content based on said analysis of said new messages; and
populating said second template with information obtained from said analysis of said new messages, wherein said information comprises a summary of key points of said additional conversation content, wherein said second template further comprises a second recommended list of items to be discussed in said chat session.

6. The computer program product as recited in claim 5, wherein the program code further comprises the programming instructions for:
presenting said second template to said two or more users of said chat session.

7. The computer program product as recited in claim 5, wherein the program code further comprises the programming instructions for:
generating a new template targeted to a more specific classification of said topic of said determined communication content based on said analysis of said new messages, wherein said new template is nested within said first template; and
populating said new template with information obtained from said analysis of said new messages, wherein said information comprises a summary of key points of said additional conversation content, wherein said new template further comprises a second recommended list of items to be discussed in said chat session.

8. The computer program product as recited in claim 7, wherein the program code further comprises the programming instructions for:
presenting said new template to said two or more users of said chat session.

9. A system, comprising:
a memory for storing a computer program for assisting users of a chat session to participate in said chat session; and
a processor connected to said memory, wherein said processor is configured to execute the program instructions of the computer program comprising:
analyzing messages of an instant message chat history involving a group of two or more users of said chat session to determine communication content, wherein said messages comprise text, images, audio and/or video;
identifying key points of said instant message chat history from said analysis;
summarizing said identified key points of said instant message chat history;
identifying a first template corresponding to a first level of a hierarchical template corresponding to said determined communication content, wherein said hierarchical template is a template that includes different levels of a hierarchy or nested templates, wherein said first template corresponds to a general classification of a topic of said determined communication content, wherein said first template comprises a first recommended list of items to be discussed in said chat session;

loading said first template;

populating said first template with information obtained from said analysis of said messages of said instant message chat history, wherein said information comprises said summary of said identified key points of said instant message chat history;

presenting said first template to said two or more users of said chat session;

monitoring said chat session after presenting said first template to said two or more users of said chat session;

analyzing new messages to determine additional conversation content;

loading a second template corresponding to a second level of said hierarchical template directed to a more specific classification of said topic of said determined communication content based on said analysis of said new messages; and populating said second template with information obtained from said analysis of said new messages, wherein said information comprises a summary of key points of said additional conversation content, wherein said second template further comprises a second recommended list of items to be discussed in said chat session.

10. The system as recited in claim 9, wherein the program instructions of the computer program further comprise:

presenting said second template to said two or more users of said chat session.

11. The system as recited in claim 9, wherein the program instructions of the computer program further comprise:

generating a new template targeted to a more specific classification of said topic of said determined communication content based on said analysis of said new messages, wherein said new template is nested within said first template; and populating said new template with information obtained from said analysis of said new messages, wherein said information comprises a summary of key points of said additional conversation content, wherein said new template further comprises a second recommended list of items to be discussed in said chat session.

* * * * *